(12) United States Patent
Riley et al.

(10) Patent No.: US 7,554,081 B2
(45) Date of Patent: Jun. 30, 2009

(54) METHOD AND APPARATUS FOR DETERMINING SILICON CONTENT OF THE EARTH FORMATIONS IN CASED WELL BORES

(75) Inventors: Stephen Riley, Spring, TX (US); David Chace, Houston, TX (US); Darryl E. Trcka, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/734,550

(22) Filed: Apr. 12, 2007

(65) Prior Publication Data

US 2008/0251710 A1 Oct. 16, 2008

(51) Int. Cl.
*G01V 5/10* (2006.01)
(52) U.S. Cl. .................................. 250/269.7
(58) Field of Classification Search ............... 250/269.7
See application file for complete search history.

(56) References Cited

U.S. PATENT DOCUMENTS

| 4,317,993 | A | 3/1982 | Hertzog, Jr. et al. ......... 250/270 |
| 4,580,050 | A * | 4/1986 | Paap ....................... 250/269.7 |
| 4,722,220 | A | 2/1988 | Herron ........................ 73/152 |
| 7,142,985 | B2 | 11/2006 | Edwards ........................ 702/6 |
| 7,186,971 | B2 | 3/2007 | Riley et al. ............... 250/269.6 |
| 7,205,535 | B2 | 4/2007 | Madigan et al. .......... 250/269.6 |

FOREIGN PATENT DOCUMENTS

EP 457628 A2 * 11/1991

* cited by examiner

*Primary Examiner*—Constantine Hannaher
(74) *Attorney, Agent, or Firm*—Madan & Sriram, P.C.

(57) ABSTRACT

Measurements made with a pulsed neutron source and three or more gamma ray detectors are used to estimate the silicon and oxygen content of earth formations.

23 Claims, 3 Drawing Sheets

METHOD AND APPARATUS FOR DETERMINING SILICON CONTENT OF THE EARTH FORMATIONS IN CASED WELL BORES

BACKGROUND OF THE INVENTION

This invention relates generally to oil and gas well logging tools. More particularly, this invention relates tools for measuring the Silicon content of rock formations through the use of gamma rays generated by a pulsed neutron source.

In petroleum and hydrocarbon production, it is desirable to know the porosity and density of the subterranean formation which contains the hydrocarbon reserves. Knowledge of porosity and density is useful in calculating the oil saturation and thus the volume of oil in-place within the reservoir. Knowledge of porosity is particularly useful in older oil wells where porosity information is either insufficient or nonexistent to determine the remaining in-place oil and to determine whether sufficient oil exists to justify applying enhanced recovery methods. Porosity information is also helpful in identifying up-hole gas zones and differentiating between low porosity liquid and gas.

If the density of the formation is known, then porosity can be determined using known equations. A variety of tools exist which allow the density of the reservoir to be determined. Most of these tools are effective in determining the density (and hence porosity) of the reservoir when the wellbore in which the tool is run is an uncased reservoir and the tool is able to contact the subterranean medium itself. However, once a well has been cased, there exists a layer of steel and concrete between the interior of the wellbore where the tool is located and the formation itself. The well casing makes it difficult for signals to pass between the tool and the reservoir and visa versa. In addition, the cement can confuse the measurement of formation properties.

U.S. patent application Ser. No. 11/115,792 of Gilchrist discloses a method and apparatus for estimating formation density of a subterranean formation using a pulsed neutron source and three gamma ray detectors. The method disclosed therein may be used in cased boreholes. The present invention is directed towards using an apparatus similar to that disclosed in Gilchrist for determining an elemental composition of formations. This problem of determining elemental composition has been addressed, for example, in U.S. Pat. No. 4,722,220 to Herron, U.S. Pat. No. 4,317,993 to Hertzog, U.S. application Ser. No. 10/916,921 (now U.S. Pat. No. 7,205,535) of Madigan et al. The method discussed here is much simpler and can be used with existing tools for density determination.

SUMMARY OF THE INVENTION

One embodiment described herein is a method of estimating a quantity of at least two elements in an earth formation. The method includes irradiating the earth formation with a source of neutrons within a borehole, moving logging tool with a velocity within the borehole and using at least three detectors on the logging tool to detect gamma rays produced in the earth formation as a result of the irradiating, using the velocity of the logging tool for processing counts made by be the detectors to estimate the quantity of the at least two elements, and recording the estimated quantity of the two elements on a suitable medium. The two elements may be silicon and oxygen. Half-lives of the gamma rays may be between 2 seconds and 500 seconds. The irradiating may include pulsing the neutron source. Estimating the velocity of the logging tool may be done using measurements made by the three detectors over an energy window characteristic of oxygen excitation. The method may further include calibrating the three detectors by making measurements in a formation having high background radiation with the neutron source deactivated. The method may further include using the estimated quantity of the two elements for determining a mineralogy of the earth formation, a water saturation of the earth formation, a void space in a gravel pack, and/or a porosity of the earth formation.

Another embodiment is an apparatus for estimating a quantity of at least two elements in an earth formation. The apparatus includes a source of neutrons configured to irradiate the earth formation from within the borehole, a logging tool configured to move with a velocity within the borehole, the logging tool having at least three detectors configured to detected gamma rays produced in the earth formation as a result of the irradiating. The apparatus also includes a processor configured to processed counts made by the three detectors using the velocity of the logging tool to estimate the quantity of the two elements, and record the estimated quantity of the two elements on a suitable medium. The two elements may be silicon and oxygen. The gamma rays produced by the irradiation may have a half-life between 2 seconds and 500 seconds. The processor may be configured to estimate the quantity of the two elements by solving a set of simultaneous equations involving counts made by the three detectors. The neutron source may be a pulsed neutron source. The processor may be further configured to estimate the velocity of the logging tool using measurements made by the three detectors over an energy window characteristic of oxygen excitation. The processor may be further configured to calibrate the three detectors using measurements in a formation having high background gamma radiation with the neutron source deactivated. The processor may be further configured to use the estimated quantity of the at least two elements for determining a mineralogy of the earth formation, a water saturation of the earth formation, a void space in a gravel pack, and/or a porosity of the formation. The apparatus may further include a conveyance device configured to convey the logging tool into the borehole.

Another disclosed embodiment is a computer-readable medium for use with an apparatus for estimating a quantity of at least two elements in an earth formation. The apparatus includes a source of neutrons configured to irradiate the earth formation from within a borehole and a logging tool configured to move with a velocity within the borehole, the logging tool having at least three detectors configured to detect gamma rays produced as a result of the irradiating. The medium includes instructions which enable a processor to process counts made by the at least three detectors using the velocity of the logging tool to estimate the quantity of the at least two elements, and record the estimated quantity of the at least two elements on a suitable medium. The medium may include a ROM, an EPROM, an EEPROM, a flash memory, and/or an optical disk.

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
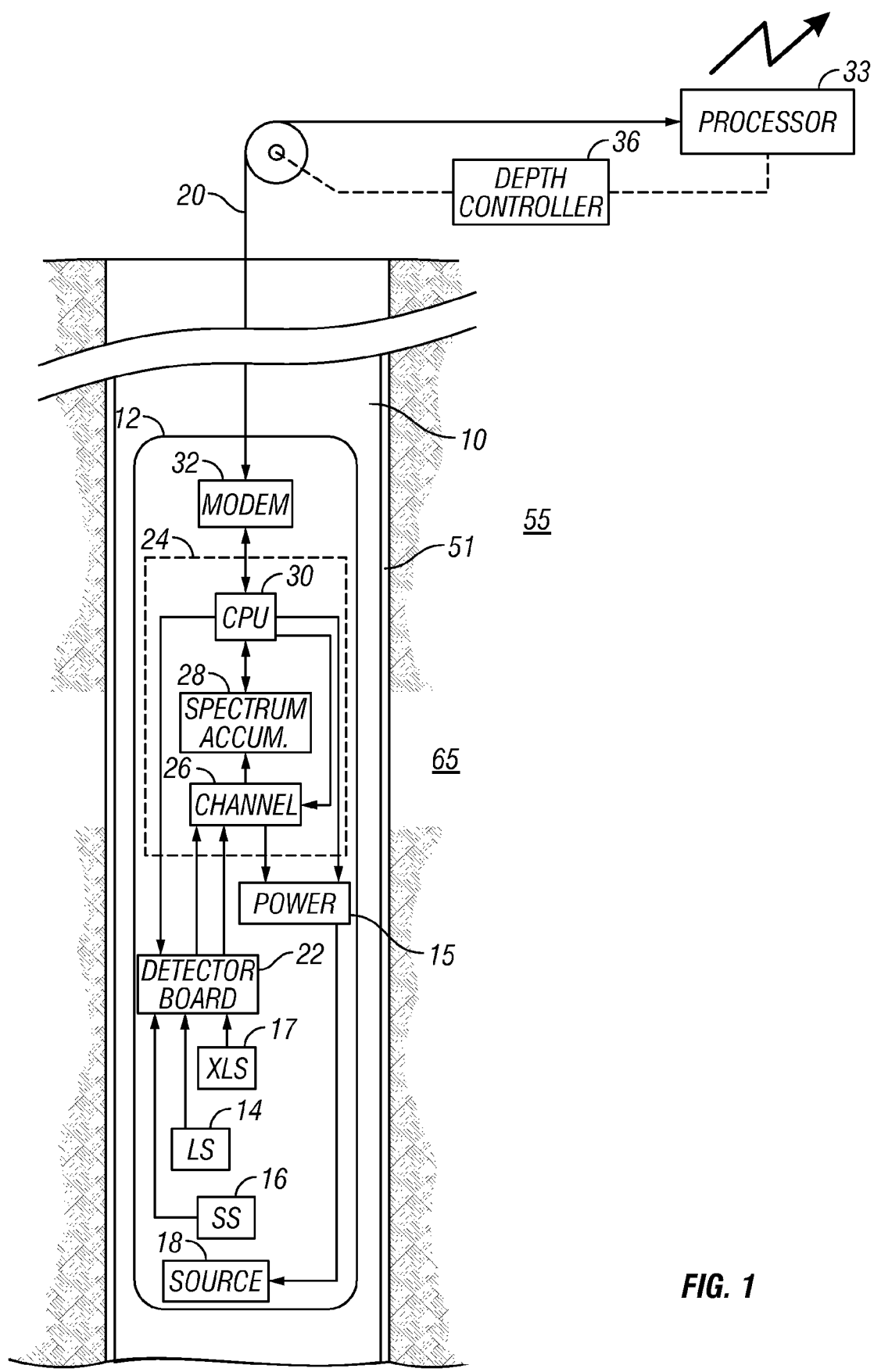
FIG. 1 is an overall schematic diagram of the nuclear well logging system of the present invention.

The system shown in FIG. 1 is suitable for use with the present invention. Well 10 penetrates the earth's surface and may or may not have casing 51, Disposed within well 10 is subsurface well logging instrument 12, The system diagramed in FIG. 1 is a microprocessor-based nuclear well logging system using multi-channel scale analysis for determining the timing distributions of the detected gamma rays. Well logging instrument 12 includes an extra-long spaced (XLS) detector 17, a long-spaced (LS) detector 14, a short-spaced (SS) detector 16 and pulsed neutron source 18, In one embodiment of the invention, XLS, LS and SS detectors 17, 14 and 16 are comprised of suitable material such as bismuth-germanate (BGO) crystals or sodium iodide (NaI) coupled to photomultiplier tubes. To protect the detector systems from the high temperatures encountered in boreholes, the detector system may be mounted in a Dewar-type flask. This particular source and flask arrangement is an example only, and should not be considered a limitation. Also, in one embodiment of the invention, source 18 comprises a pulsed neutron source using a D-T reaction wherein deuterium ions are accelerated into a tritium target, thereby generating neutrons having an energy of approximately 14 MeV. This particular type of source is for exemplary purposes only and not to be construed as a limitation. The filament current and accelerator voltage are supplied to source 18 through power supply 15, Cable 20 suspends instrument 12 in well 10 and contains the required conductors for electrically connecting instrument 12 with the surface apparatus.

The outputs from XLS, LS and SS detectors 17, 144 and 16 are coupled to detector board 22, which amplifies these outputs and compares them to an adjustable discriminator level for passage to channel generator 26. Channel generator 26 is a component of multi-channel scale (MCS) section 24 which further includes spectrum accumulator 28 and central processor unit (CPU) 30. MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Channel generator 26 also generates synchronization signals which control the pulse frequency of source 18, and further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. The system operator accesses the master controller 34 to allow the system operator to provide selected input for the logging operation to be performed by the system. Display unit 40 and mass storage unit 44 are also coupled to master controller 34. The primary purpose of display unit 40 is to provide visual indications of the generated logging data as well as systems operations data. Storage unit 44 is provided for storing logging data generated by the system as well as for retrieval of stored data and system operation programs. A satellite link may be provided to send data and or receive instructions from a remote location.

In a well logging operation such as is illustrated by FIG. 1, master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 1000 bursts/second (1 KHz). This, in turn, causes a burst of high energy neutrons on the order of 14 MeV to be introduced into the surrounding formation to be investigated. As discussed below with reference to FIG. 2, this population of high energy neutrons introduced into the formation will cause the generation of gamma rays within the formation which at various times will impinge on XLS, LS and SS detectors 17, 14 and 16. As each gamma ray thus impinges upon the crystal-photomultiplier tube arrangement of the detectors, a voltage pulse having an amplitude related to the energy of the particular gamma ray is delivered to detector board 22. It will be recalled that detector board 22 amplifies each pulse and compares them to an adjustable discriminator level, typically set at a value corresponding to approximately 100 KeV. If a pulse has an amplitude corresponding to an energy of at least approximately 100 KeV, the voltage pulse is transformed into a digital signal and passed to channel generator 26 of MCS section 24.

In addition, as would be known to those versed in the art, many of the functions of the components described with reference to FIG. 1 may be carried out by a processor. It should also be noted that the system described in FIG. 1 involves conveyance of the logging device into the well by a wireline. However, it is envisaged that the logging device could be part of a measurement while drilling (MWD) bottomhole assembly conveyed into the borehole by a drilling tubular such as a drillstring or coiled tubing. In addition, it should be noted that FIG. 1 illustrates a tool in an open hole. The method and apparatus are equally well suited for use in cased holes.

Figure 2:
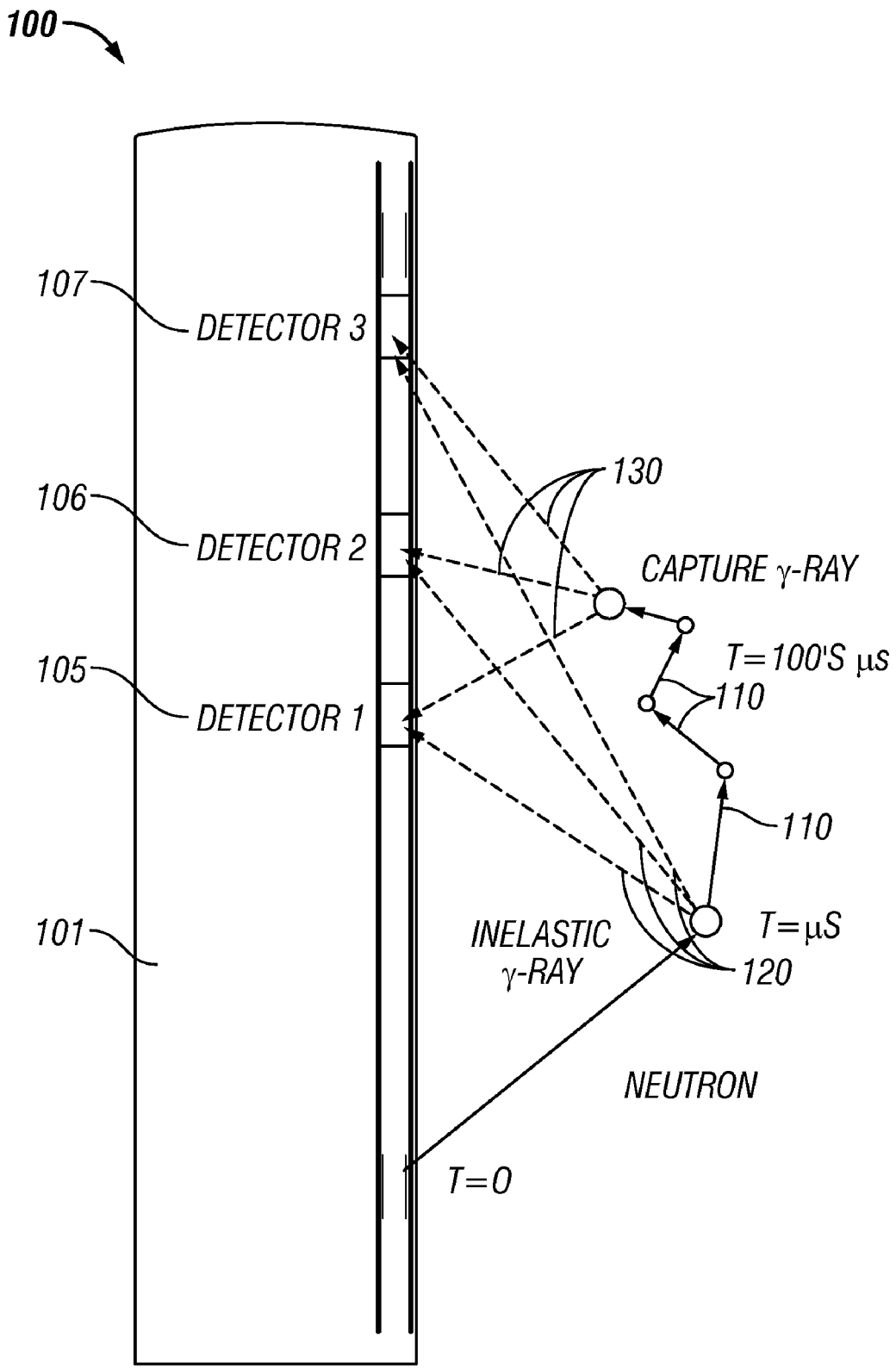
FIG. 2 illustrates the generation of gamma rays by inelastic scattering and capture of thermal and epithermal neutrons.

FIG. 2 shows an illustration of the logging tool suitable for use with the present invention. The apparatus illustrated is that of the Reservoir Performance Monitor (RPM) of Baker Atlas Incorporated. A measurement device 100 comprises a neutron source 101 and three axially spaced apart detectors described below. The number of detectors shown in the embodiment of FIG. 2 is only an example of the number of detectors employed in an embodiment of the present invention. It is not a limitation on the scope of the present invention. The measurement device of the present invention may comprise three or more detectors. The neutron source 101 may be pulsed at different frequencies and modes for different types of measurements. The short-spaced (SS) detector 105 is closest to the source 101. The long-spaced (LS) detector is denoted by 106, and the furthest detector 107 is referred to as the extra-large spaced (XLS) detector. Fast neutrons (approximately 14 MeV) are emitted from the source 101 and enter the borehole and formation, where they undergo several types of interactions. During the first few microseconds (µs), before they lose much energy, some neutrons are involved in inelastic scattering with nuclei in the borehole and formation and produce gamma rays. These inelastic gamma rays 120, have energies that are characteristic of the atomic nuclei that produced them. The atomic nuclei found in this environment include, for example, carbon, oxygen, silicon, calcium, and some others.

Two or more gamma-ray detectors are employed, in one or more modes of operation. Such modes include, but are not limited to, a pulsed neutron capture mode, a pulsed neutron spectrometry mode, a pulsed neutron holdup imager mode, and a neutron activation mode. In a pulsed neutron capture mode, for example, the tool pulses at 1 kHz, and records a complete time spectrum for each detector. An energy spectrum is also recorded for maintaining energy discrimination levels. Time spectra from short-spaced and long-spaced detectors can be processed individually to provide traditional thermal neutron capture cross section information, or the two spectra can be used together to automatically correct for borehole and diffusion effects and produce results substantially approximating intrinsic formation values.

In a pulsed neutron spectrometry mode, the instrument pulses at 10 kHz, for example, and records full inelastic and capture gamma ray energy spectra from each detector. These data are processed to determine critical elemental ratios including carbon/oxygen and calcium/silicon from the inelastic spectra and silicon/calcium from the capture spectra. A pulsed neutron holdup imager mode yields both energy spectra and time decay spectra from each detector simultaneously. Measurements can be used to determine holdups of gas, oil, and water. When combined with other production logs, the measurements made herein can provide a comprehensive production profile picture, even in deviated or horizontal wells. A neutron activation mode provides water-flow measurements using one of several data acquisition methods. Stationary measurements are made in either of two modes, and measurements at different logging speeds can be used to segregate different flow rates in either an annulus or in an adjacent tubing string. Various spectra of count rates from these can be used either individually or in combination as needed for each measurement mode.

With the neutron generator turned off, the measurement apparatus can also be used to detect the distribution of materials, tagged with radioactive tracers, that are injected into the well during well treatments. In this manner, the effectiveness of operations such as hydraulic fracturing or gravel pack placement can be evaluated.

In an embodiment of the present invention, a pulsed neutron generator with improved reliability and higher output is coupled with high-speed downhole microprocessor-controlled drivers and detector electronics. The system supports multiple frequency operation and different detection gate timings to make the different measurements. The modes of operation can be selected from the surface with no need to pull the tool out of the well.

After just a few μs, most of the neutrons are slowed by either inelastic or elastic scattering until they reach thermal energies, about 0.025 eV. This process is illustrated schematically in FIG. 2 as the sequence of solid arrows 110. At thermal energies, neutrons continue to undergo elastic collisions, but they no longer lose energy on average. A few μs after the neutron generator shuts off, this process is complete. Over the next several hundred μs, thermal neutrons are captured by nuclei of various elements—again producing gammas rays, known as capture gamma rays 130. A capture gamma ray energy spectrum yields information about the relative abundances of these elements.

The present disclosure deals with measurements made by the logging tool 12 when it is in motion. Of particular interest is analysis of an interval such as 65 in the formation 55. By analyzing measurements made with the three detectors while the tool is in motion, it is possible to estimate the quantities of elements such as oxygen, silicon and iron in the interval 65. This is discussed next.

Figure 3:
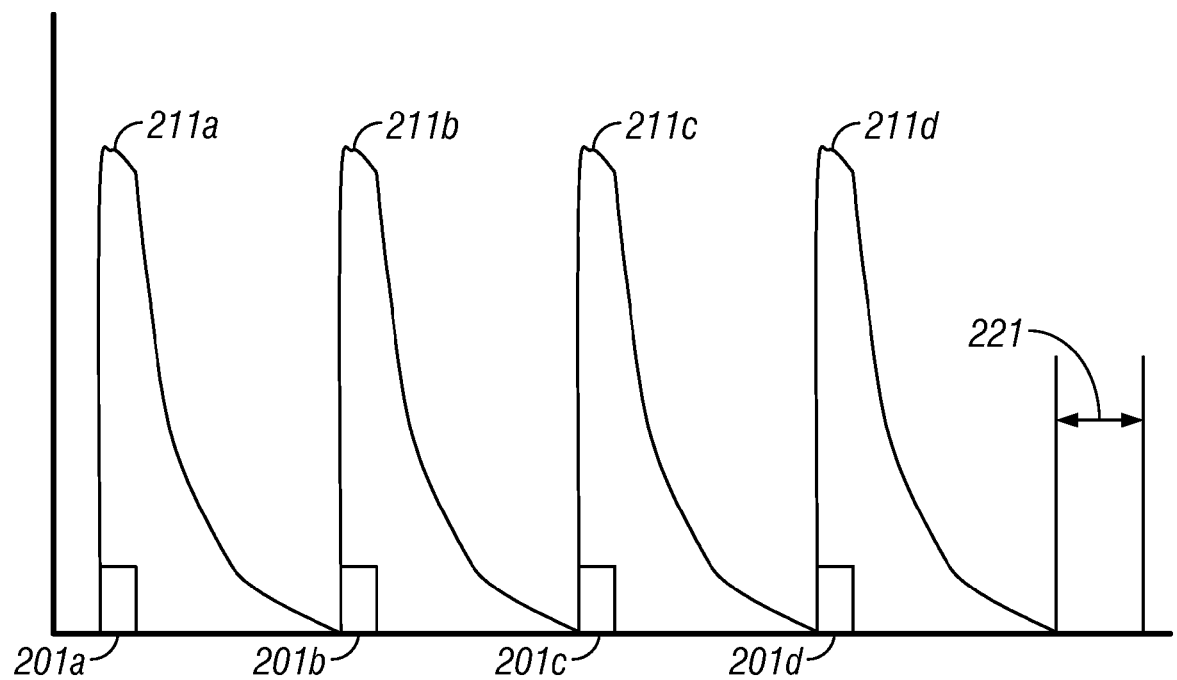
FIG. 3 schematically illustrates the pulsing and data acquisition according to one embodiment.

An exemplary sequence of pulsing is schematically illustrated in FIG. 3. Shown therein is a sequence of pulses 201a, 201b, 201c, 201d of the pulsed neutron source 18. The gamma ray measurements corresponding to the pulses are denoted by 211a, 211b, 211c, 211d. We first focus on measurements made during an interval such as 221 which, typically, starts about 2 ms after the initiation of pulse 201d.

We denote by BKS, BKL and BKX the measurements made by the short, long and extra long detectors 16, 14 and 17 respectively during an interval such as 221. This interval may start about 2 ms after of the pulse 201d. In particular, the pulsing of the neutron source activates oxygen, silicon and iron present in the near-wellbore environment. The characteristic half-lives for gamma ray emission from oxygen and silicon are 7.13 seconds and 134 seconds respectively, while the half-life for iron is of the order of seven hours. When measurements are made in a cased borehole, the signal from iron will be ubiquitous. The detector count-rates are, for the case where the source-detector spacings are 1, 2 and 3 feet respectively, then given by the following simplified equations $$BKS = (\text{background} + \text{Iron}) + \frac{\text{Si}(t0)}{2^n} + \frac{\text{O}(t0)}{2^m} \quad (1)$$

$$BKL = (\text{background} + \text{Iron}) + \frac{\text{Si}(t0)}{2^{2n}} + \frac{\text{O}(t0)}{2^{2m}}, \text{ and}$$

$$BKX = (\text{background} + \text{Iron}) + \frac{\text{Si}(t0)}{2^{3n}} + \frac{\text{O}(t0)}{2^{3m}}.$$

In eqn. 1, it is assumed that during the observation time, there is very little decrease in radiation from the activated iron so that it may be included with the background gamma radiation. $\text{Si}(t0)$ and $\text{O}(t0)$ are the initial contributions to the total count-rate from the activated silicon and oxygen respectively. The parameters m and n are derived from the half-lives of oxygen and silicon respectively and the velocity of tool motion. Those versed in the art would recognize that relative values of the exponents in eqn. 1 for the different detectors are related to the relative source-detector distances. For example, if the source-detector spacings are 1, 2 and 4 feet, the exponents would be m, 2m and 4m (and n, 2n and 4n) and are an exponential function of the time it takes a particular detector to pass a specific point in the of earth formation. The half life $t_{1/2}$ defines an exponential decay constant $$\lambda = \frac{t_{1/2}}{\log(2)}.$$

Thus, as the tool is moved past, the counts made by the three detectors are indicative of the amounts of oxygen, silicon and iron in an interval such as 65 in the earth formation 55 (see FIG. 1). Eqn. 1 is set of three simultaneous equations which can be solved to estimate the value of the silicon count at time zero (which is proportional to the quantity of silicon present in the volume sensed by the tool). This value is sensitive to the source output and the tool velocity. The source output from the RPM tool is very stable and should not be a problem. However, the tool velocity needs to be known accurately.

In one embodiment, surface measurements of tool velocity are used. In another embodiment, tool velocity is determined from a combination of accelerometer measurements and surface measurements. Such a method is discussed, for example, in U.S. Pat. No. 7,142,985 to *Edwards* et al., having the same assignee as the present disclosure and the contents of which are incorporated herein by reference. In other embodiments of the disclosure, actual tool velocity is determined directly from the gamma-ray measurements. These are discussed next.

In one embodiment, measurements are made at the three detectors over energy windows specific to the oxygen excitation and gamma ray decay. The lower and upper bounds of the energy window are selected such that the majority of the gamma rays generated by activated oxygen are detected and discriminated from other background events. An exemplary window would be from 3 MeV to 8 MeV. Under these conditions, we have three measurements and three unknowns. The unknowns are the background gamma ray count, the initial count rate from oxygen, and the tool velocity. These three equations can be solved to give the tool velocity. This tool velocity is then used for solving the set of eqns. (1) above. In yet another embodiment, the method described in U.S. patent application Ser. No. 10/879,620 (now U.S. Pat. No. 7,186,971) of Riley et al., having the same assignee as the present disclosure and the contents of which are incorporated herein by reference. The method described by Riley is directed towards determination of a rate of flow of fluids in the vicinity of the borehole using measurements from the three detectors which use windowed energy levels corresponding to oxygen. Among the methods disclosed in Riley is a correlation of signals OA1, OA2 and OA3 at the three detectors. In the present instance, a similar method is used to determine the velocity of tool motion past an interval such as 65.

Part of the calibration of the tool is based upon logging in a formation having high background gamma radiation, such as a shale, with the neutron source deactivated. When the tool is conveyed past such an interval, all three detectors should have the same readings independent of the tool speed when a particular detector is adjacent to the shale. Alternatively, surface calibration may be carried out using a method similar to that for calibration of the natural gamma ray tool.

At a logging speed of 5 ft/m, the time taken for the detectors to pass over the formation that has been irradiated is 12 seconds for the short spaced, 24 seconds for the long spaced and 36 seconds for the extra long spaced detector. Under these conditions, the equations become:

$$BKS = (\text{background} + \text{Iron}) + \frac{Si(t0)}{1.06404} + \frac{O(t0)}{3.21102} \quad (2)$$

$$BKL = (\text{background} + \text{Iron}) + \frac{Si(t0)}{1.13218} + \frac{O(t0)}{10.7672}, \text{ and}$$

$$BKX = (\text{background} + \text{Iron}) + \frac{Si(t0)}{1.20469} + \frac{O(t0)}{33.10755}.$$

If a value of one hour is used for the iron half-life, the difference in the contribution of iron to the count rates of the three detectors is less than one part in two thousand.

It is further contemplated that a logging tool with four detectors would provide an overdetermined set of equations (1) and may provide improved accuracy in the presence of measurement noise. It is envisaged that the method described above may be suitable for identifying any two elements for which the half-life is between about two seconds and 500 seconds at practical logging speeds.

The estimated silicon and oxygen in the formation may typically be recorded on a suitable medium and used for further operations. There are a variety of possible uses of the method described above. Since sandstones consist primarily of $SiO_2$ while carbonate rocks (limestones and dolomites) should normally contain no silicon, the Si/O ratio may be used to distinguish between sandstones and carbonate rocks in the earth formation. This knowledge is helpful in designing perforations in the casing and fracturing operations that may be carried out in the earth formation. The formation density measurement combined with the Si and O measurements described above are used for diagnostics for evaluating void space in gravel packs and taking appropriate remedial action. In combination with an independent estimate of porosity, the estimate of oxygen can be used to derive a water saturation of the formation based upon the fact that a hydrocarbon-filled pore space would contain no oxygen.

The processing of the measurements made in wireline applications may be done by the surface processor 33, by a downhole processor, or at a remote location. The data acquisition may be controlled at least in part by the downhole electronics. Implicit in the control and processing of the data is the use of a computer program on a suitable machine readable medium that enables the processors to perform the control and processing. The machine readable medium may include ROMs, EPROMs, EEPROMs, Flash Memories and Optical disks.

While the foregoing disclosure is directed to the specific embodiments of the invention, various modifications will be apparent to those skilled in the art. It is intended that all such variations within the scope and spirit of the appended claims be embraced by the foregoing disclosure.

What is claimed is:

1. A method of estimating a quantity of at least two elements in an earth formation, the method comprising:
    irradiating the earth formation with a source of neutrons within a borehole;
    moving a logging tool with a single velocity within the borehole and using at least three detectors on the logging tool to detect gamma rays produced in the earth formation as a result of the irradiating and produce counts responsive to each of the at least two elements;
    processing the counts to estimate the quantity of the at least two elements, the processing using a value of the single velocity of the logging tool; and
    recording the estimated quantity of the at least two elements on a suitable medium 2. The method of claim 1 wherein the at least two elements comprise silicon (Si) and oxygen (0).

3. The method of claim 1 wherein half lives of the gamma rays produced by the irradiation is between about two seconds and 500 seconds.

4. The method of claim 1 wherein estimating the quantity of the at least two elements further comprises solving a set of simultaneous equations involving the counts made by the at least three detectors.

5. The method of claim 1 wherein the irradiating further comprises pulsing the neutron source.

6. The method of claim 5 wherein the detecting further comprises making measurements at a starting time at least 2 ms after a start time of a pulse.

7. The method of claim 1 further comprising estimating the velocity of the logging tool using measurements made by the at least three detectors over an energy window characteristic of oxygen excitation, the estimation taking into account a background gamma ray count.

8. The method of claim 1 further comprising calibrating the at least three detectors by making measurements in a formation having high background gamma radiation with the neutron source deactivated.

9. The method of claim 1 further comprising using the estimated quantity of the at least two elements for determining at least one of (i) a mineralogy of the earth formation, (ii) a water saturation of the formation, (iii) a void space in a gravel pack, and (iv) a porosity of the formation.

10. The method of claim 1 wherein the borehole comprises a cased borehole.

11. An apparatus for estimating a quantity of at least two elements in an earth formation, the apparatus comprising:
a source of neutrons configured to irradiate the earth formation from within a borehole;
a logging tool configured to move within the borehole;
at least three detectors on the logging tool configured to produce counts of gamma rays produced in the earth formation by each of the at least two elements as a result of the irradiating; and
a processor configured to process counts made by the at least three detectors using a single velocity of the logging tool to estimate the quantity of the at least two elements.

12. The apparatus of claim 11 wherein the at least two elements comprise silicon (Si) and oxygen (O).

13. The apparatus of claim 11 wherein half lives of the gamma rays produced by the irradiation is between about two seconds and 500 seconds.

14. The apparatus of claim 11 wherein the processor is configured to estimate the quantity of the at least two elements by further solving a set of simultaneous equations involving the counts made by the at least three detectors.

15. The apparatus of claim 11 wherein the neutron source further comprises a pulsed neutron source.

16. The apparatus of claim 15 the detectors are further configured to make measurements at a starting time at least 2 ms after a start time of a pulse.

17. The apparatus of claim 11 wherein the processor is further configured to estimate the velocity of the logging tool using measurements made by the at least three detectors over an energy window characteristic of oxygen excitation, the estimation taking into account a background gamma ray count.

18. The apparatus of claim 11 wherein the processor is further configured to calibrate the at least three detectors using measurements in a formation having high background gamma radiation with the neutron source deactivated.

19. The apparatus of claim 11 wherein the processor is further configured to use the estimated quantity of the at least two elements for determining at least one of (i) a mineralogy of the earth formation, (ii) a water saturation of the formation, (iii) a void space in a gravel pack, and (iv) a porosity of the formation.

20. The apparatus of claim 11 further comprising a conveyance device configured to convey the logging tool into the borehole.

21. The apparatus of claim 11 wherein the borehole comprises a cased borehole.

22. A computer-readable medium accessible to at least one processor, the computer-readable medium including instructions which enable the at least one processor to estimate a quantity of at least two elements in an earth formation using a single velocity of a logging tool configured to move within a borehole and measurements made by at least three detectors on the logging tool configured to detect gamma rays responsive to irradiation of the earth formation by a source of neutrons on the logging tool wherein counts of the gamma rays are responsive to each of the at least two elements.

23. The medium of claim 22 further comprising at least one of: (i) a ROM, (ii) an EPROM, (iii) an EEPROM, (iv) a flash memory, and (v) an optical disk.

* * * * *